United States Patent
Goto

(10) Patent No.: US 8,510,575 B2
(45) Date of Patent: Aug. 13, 2013

(54) POWERING ON LOCAL SERVER USING CONTENT LIST

(75) Inventor: Satoru Goto, Ichikawa (JP)

(73) Assignee: Buffalo Inc., Nagoya-shi (JP)

( * ) Notice: Subject to any disclaimer, the term of this patent is extended or adjusted under 35 U.S.C. 154(b) by 410 days.

(21) Appl. No.: 12/887,072

(22) Filed: Sep. 21, 2010

(65) Prior Publication Data

US 2011/0072103 A1    Mar. 24, 2011

(30) Foreign Application Priority Data

Sep. 24, 2009 (JP) .................................. 2009-219806

(51) Int. Cl.
*G06F 1/00* (2006.01)
(52) U.S. Cl.
USPC ........................................................ 713/300
(58) Field of Classification Search
USPC ......... 709/203, 208, 220–222, 227; 713/300; 328/318
See application file for complete search history.

(56) References Cited

U.S. PATENT DOCUMENTS

| 2005/0123109 A1* | 6/2005 | Yamagishi et al. ...... 379/102.01 |
| 2006/0230142 A1* | 10/2006 | Yamamoto et al. ........... 709/224 |
| 2007/0100839 A1* | 5/2007 | Kim et al. ....................... 707/10 |
| 2008/0183719 A1* | 7/2008 | Kageyama et al. ............. 707/10 |

FOREIGN PATENT DOCUMENTS

| JP | 3-212716 | 9/1991 |
| JP | 2005-51473 | 2/2005 |
| JP | 2006-217125 | 8/2006 |
| JP | 2008-41120 | 2/2008 |

OTHER PUBLICATIONS

U.S. Appl. No. 12/887,095, filed Sep. 21, 2010, Goto.
Office Action issued Aug. 16, 2011, in Japanese Patent Application No. 2009-219806 (with English-language translation).

* cited by examiner

*Primary Examiner* — Lance L Barry
(74) *Attorney, Agent, or Firm* — Oblon, Spivak, McClelland, Maier & Neustadt, L.L.P.

(57) ABSTRACT

A local server 200 transmits power supply ON information C as a content list to the local reproduction device 300 in the power OFF mode, the power supply ON information requesting a transition to the power ON mode. The local server 200 receives a power supply ON request from the local reproduction device 300, the power supply ON request indicating that the power supply ON information has been selected. The local server 200 causes a transition from the power OFF mode to the power ON mode in response to the power ON request.

8 Claims, 6 Drawing Sheets

POWERING ON LOCAL SERVER USING CONTENT LIST

CROSS REFERENCE TO RELATED APPLICATION

This application is based upon and claims the benefit of priority from the prior Japanese Patent Application No. 2009-219806 filed on Sep. 24, 2009; the entire contents of which are incorporated herein by reference.

BACKGROUND OF THE INVENTION

1. Field of the Invention

The present invention relates to a local server and a method for controlling the same, the local server configured to transmit a content list to a local reproduction device connected to the local server via a local network, the content list being a list of content that is capable of being provided to the local reproduction device.

2. Description of the Related Art

In recent years, technologies aimed to promote utilization of content data such as video and audio data in DLNA (Digital Living Network Alliance) have been under development. For example, studies have been in progress on technologies promoting utilization of content data by transmitting the content data from a local server, so-called DMS (Digital Media Server) to a local reproduction device, so-called DMP (Digital Media Player).

Here, the content transmitted from the local server to the local reproduction device is managed by using a content list called CDS (Content Directory Service). In the CDS, content is managed in tiers. Users view and listen to desired content using CDS (content list) displayed by the local reproduction device.

SUMMARY OF THE INVENTION

In order to reduce power consumption, it is preferable to control the power supply of the local server in conjunction with the power supply of the local reproduction device. However, in order to achieve such power supply conjunction feature, it is necessary to install dedicated software to the local reproduction device.

However, it is assumed that the local reproduction device does not have a feature to allow installation of new software. In such a case, the power supply conjunction feature may not be achieved.

Thus, the present invention has been made to solve the problem described above, and it is an object of the present invention to provide a local server and a method for controlling the same where the local server is capable of controlling the power supply thereof in conjunction with the power supply of the local reproduction device without installing dedicated software to the local reproduction device.

In an aspect of the present invention, a local server (local server 200) configured to transmit a content list to a local reproduction device (local reproduction device 300) connected to the local server via a local network (local network 100), the content list being a list of content that is capable of being provided to the local reproduction device, the local server having a power OFF mode and a power ON mode, the local server comprising: a transmitter (processor 220, local communication unit 210) configured to transmit power supply ON information as the content list to the local reproduction device in the power OFF mode, the power supply ON information requesting a transition to the power ON mode; a receiver (processor 220, local communication unit 210) configured to receive a power supply ON request from the local reproduction device, the power supply ON request indicating that the power supply ON information has been selected; and a power supply manager (power supply manager 250) configured to cause a transition from the power OFF mode to the power ON mode in response to the power ON request.

In aforementioned aspect, the transmitter continues transmitting mode transition content to the local reproduction device in response to the power ON request until the transition from the power OFF mode to the power ON mode is completed, and the mode transition content is content for notifying that the transition from the power OFF mode to the power ON mode is in progress.

In aforementioned aspect, when the transition from the power OFF mode to the power ON mode is completed, the transmitter transmits a list of normal audiovisual content as the content list to the local reproduction device, and the normal audiovisual content is content that is capable of being provided to the local reproduction device in the power ON mode.

DESCRIPTION OF EMBODIMENTS

Figure 1:
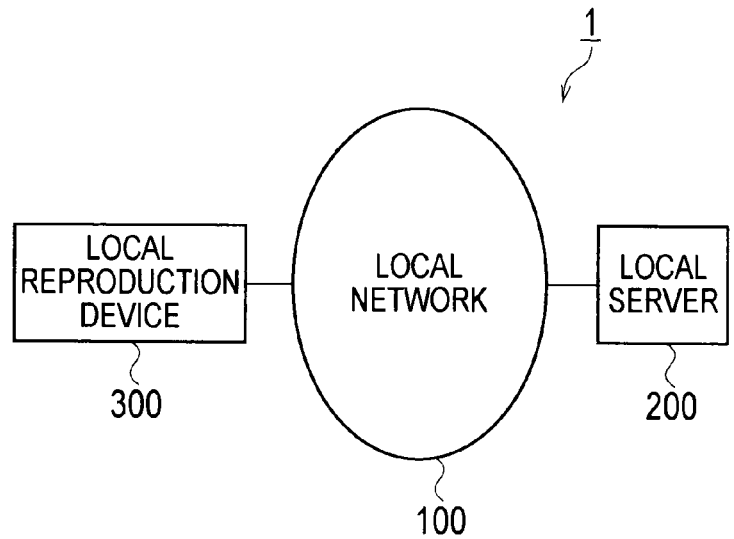
FIG. 1 is a diagram showing a content transmission system according to a first embodiment.

Next, an embodiment of the present invention is described with reference to the drawings. In the following description of the drawings, same or similar components are labeled with the same of similar reference numerals. However, it should be noted that the drawings are schematic, and ratios between dimensions are different from actual ones. Accordingly, specific dimensions should be determined in consideration of the following description. Of course, the drawings include parts between which dimensional relationship and ratios are different from each other.

[First Embodiment]

A first embodiment of the present invention is described below with reference to the drawings. Specifically, (1) Schematic Configuration of Content Transmission System, (2) Configuration of Local Server, (3) Configuration of Local Reproduction Device, (4) Operation of Content Transmission System, and (5) Operations and Effects are described.

(1) Schematic Configuration of Content Transmission System

First, a schematic configuration of a content transmission system according to the first embodiment of the present invention is described with reference to FIG. 1. FIG. 1 is a diagram showing a content transmission system 1 according to the first embodiment.

As shown in FIG. 1, the content transmission system 1 includes a local network 100, a local server 200, and a local reproduction device 300.

The local network 100 is a network such as a LAN or a wireless LAN. The local network 100 is provided independently from a public network such as the Internet.

A local server 200 is connected to a local reproduction device 300 via a local network 100. The local server 200 is a content server that provides the local reproduction device 300 with predetermined content. The local server 200 has a power ON mode and a power OFF mode as a power supply mode where power consumption of the local server 200 in the power OFF mode is lower than in the power ON mode. The local server 200 transmits a content list to the local reproduction device 300 via the local network 100, the content list being a list of content that is capable of being provided to the local reproduction device 300. The content that is capable of being provided to the local reproduction device 300 is changed according to the power supply mode of the local server 200.

Specifically, the local server 200 provides the local reproduction device 300 with normal audiovisual content and mode transition content.

Normal audiovisual content is the content that is capable of being provided from the local server 200 to the local reproduction device 300 in the power ON mode. Normal audiovisual content is, for example, audio content, video content, and image content.

The mode transition content is the content that is capable of being provided from the local server 200 to the local reproduction device 300 in the power OFF mode. Specifically, the mode transition content notifies that a transition from the power OFF mode to the power ON mode is in progress. As mode transition content, for example, audio content, image content, or video content which indicates that a transition from the power OFT mode to the power ON mode is in progress may be used.

The local reproduction device 300 is connected to the local server 200 via the local network 100. The local reproduction device 300 is a device that acquires predetermined content using a content list received from the local server 200, and reproduces the acquired content.

(2) Configuration of Local Server

Next, a configuration of a local server according to the first embodiment of the present invention is described with reference to FIGS. 2 to 5.

(2.1) Schematic Configuration of Local Server

Figure 2:
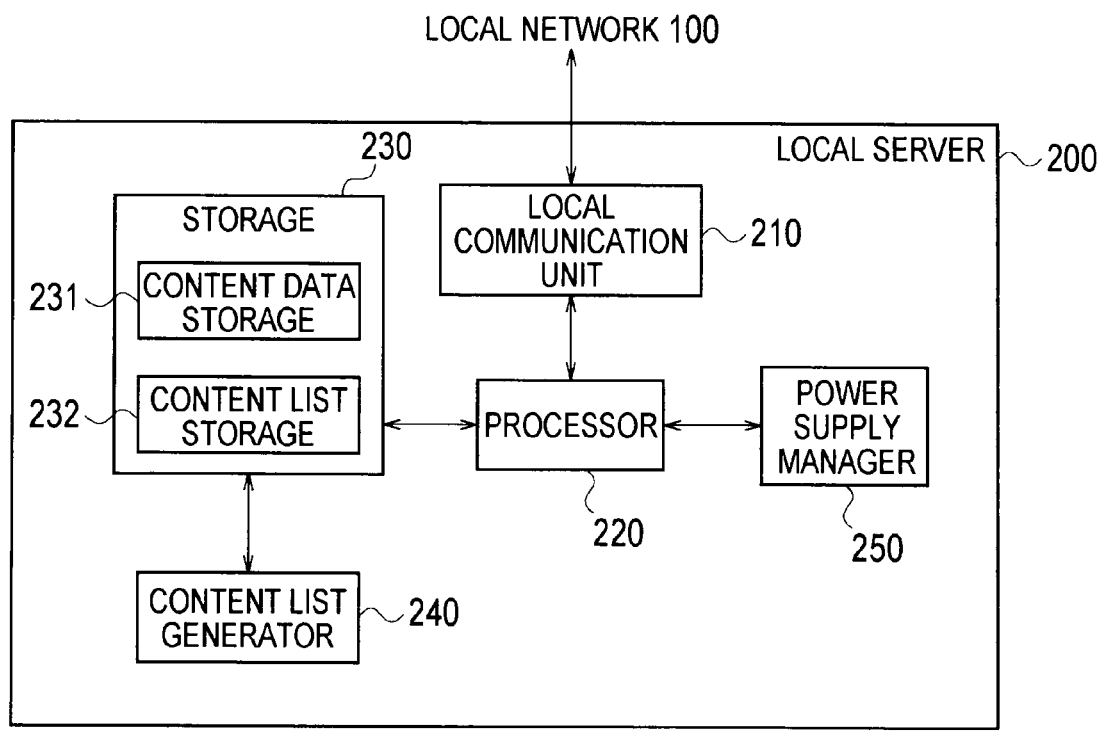
FIG. 2 is a diagram showing a local server according to the first embodiment.

FIG. 2 is a diagram showing a local server 200 according to the first embodiment. As shown in FIG. 2, the local server 200 includes a local communication unit 210, a processor 220, a storage unit 230, a content list generator 240, and a power supply manager 250.

The local communication unit 210 is a hardware interface to connect the local server 200 to the local network 100. As the local communication unit 210, a LAN port or a wireless LAN port is used.

The processor 220 performs transmission processing of content list and provision processing of content. The processor 220 determines the details of processing to be performed based on the power supply mode of the local server 200 and the information received from the local reproduction device 300. The details of processing by the processor 220 are described in detail hereinafter.

The storage unit 230 is a storage such as a HDD that stores predetermined information. As shown in FIG. 2, the storage unit 230 has a content data storage 231, and a content list storage 232.

First, the content data storage 231 stores data of normal audiovisual content (hereinafter referred to as normal audiovisual content data), and the content name assigned to each normal audiovisual content so that the content data and name are associated with each other. As normal audiovisual content data, audio data, video data, or image data is used, for example.

Second, the content data storage 231 stores data of the mode transition content. As the mode transition content data, audio data, video data, or image data is used, for example.

The content list storage 232 stores a content list generated by the content list generator 240. The content list stored in the content list storage 232 has a tree structure in which multiple items are tiered.

Figure 3:
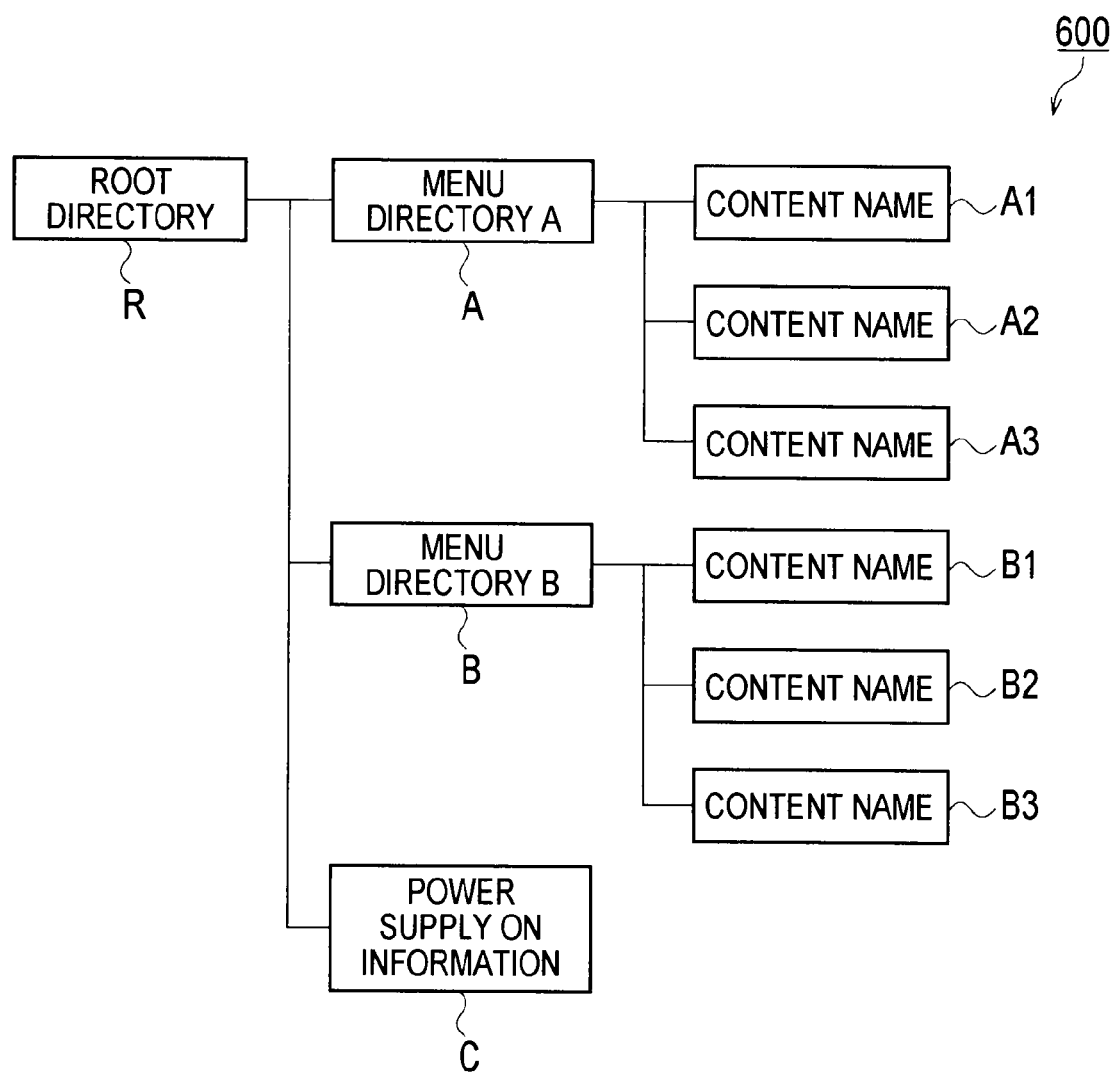
FIG. 3 is a diagram showing an example of a configuration of a content list according to the first embodiment.

Referring to FIG. 3, the structure of the content list stored in the content list storage 232 is described. FIG. 3 is a diagram showing an example of the structure of the content list.

As shown in FIG. 3, a content list 600 has a tree structure in which the root directory is placed in the top layer. The content list includes multiple items such as a root directory R, menu directories A, B, content names A1 to A3, B1 to B3, and power supply ON information C.

The root directory R is an item that is used to request the items indicating the types of content which is capable of being provided to the local reproduction device 300. In the immediate lower layer of the root directory R, as an item indicating the type of content that is capable of being provided to the local reproduction device 300, the menu directories A, B, and the power supply ON information C are placed where the menu directories A, B indicate the types of normal audiovisual content, and the power supply ON information C is used for requesting a transition from the power OFF mode to the power ON mode. When the power supply mode of the local server 200 is in the power ON mode, the menu directories A, B are transmitted as a content list to the local reproduction device 300. On the other hand, when the power supply mode of the local server 200 is in the power OFF mode, the power supply ON information C is transmitted as a content list to the local reproduction device 300.

The content names A1 to A3 are the items representing the content names assigned to the normal audiovisual content data corresponding to the type of normal audiovisual content indicated by the menu directory A. Similarly, the content names B1 to B3 are the items representing the content names assigned to the normal audiovisual content data corresponding to the type of normal audiovisual content indicated by the menu directory B.

For example, when the menu directory A represents audio content, the content names A1 to A3 represent the content names assigned to the audio content data of the normal audiovisual content data stored in the content data storage 231. For example, when the menu directory B represents video content, the content names B1 to B3 represent the content names assigned to the video content data of the normal audiovisual content data stored in the content data storage 231.

The content list generator 240 generates a content list that is a list of contents that is capable of being provided to the local reproduction device 300. The content list generator 240 generates a content list periodically in the power ON mode. The content list generator 240 updates the content list stored in the content list storage 232 to a newly generated content list.

Figure 4:
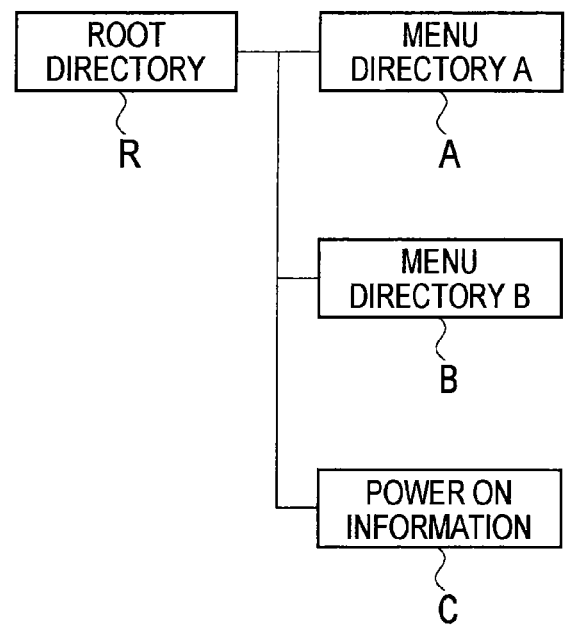
FIG. 4 is a diagram showing a generation process of the content list according to the first embodiment (#1).
Figure 5:
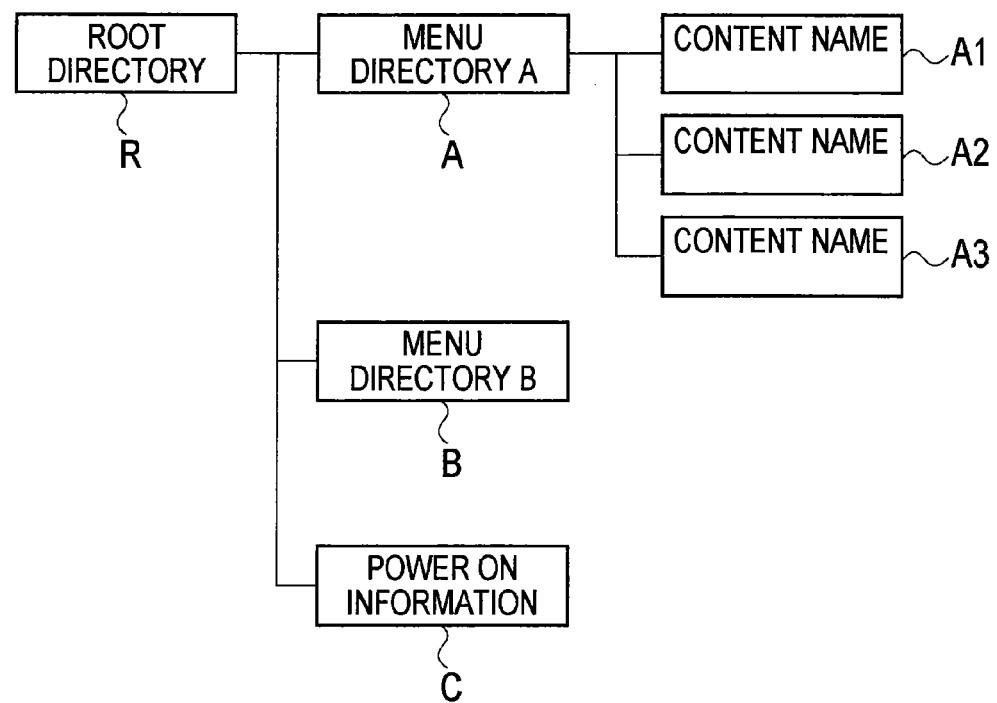
FIG. 5 is a diagram showing the generation process of the content list according to the first embodiment (#2).

The content list generator 240 generates a content list having, for example, the structure shown in FIG. 3. FIGS. 4 and 5 are diagrams showing a generation process of a content list by the content list generator 240.

First, the content list generator 240 generates items to be placed in the immediate lower layer of the root directory R. Specifically, as shown in FIG. 4, the content list generator 240 places the menu directories A, B, and the power supply ON information C in the immediate lower layer of the root directory R.

Second, the content list generator 240 generates items to be placed in the immediate lower layer of the menu directory A. Specifically, as shown in FIG. 5, the content list generator 240 acquires the content names A1 to A3 from the content data storage 231, and places the acquired content names in the immediate lower layer of the menu directory A, the content names A1 to A3 being assigned to normal audiovisual content data corresponding to the type of content (for example, audio content) represented by the menu directory A.

Similarly, the content list generator 240 generates items to be placed in the immediate lower layer of the menu directory B. Specifically, the content list generator 240 acquires the content names from the content data storage 231, and places the acquired content names in the immediate lower layer of the menu directory B, the content names being assigned to normal audiovisual content data corresponding to the type of content (for example, video content) represented by the menu directory B. In this manner, a content list having the structure shown in FIG. 4 is formed.

The power supply manager 250 manages a power supply (not shown) of the local server 200. The power supply manager 250 controls the power supply mode of the local server 200 in response to an instruction acquired from the processor 220. Specifically, the power supply manager 250 causes a transition of the power supply mode of the local server 200 from the power OFF mode to the power ON mode in response to a power supply mode transition instruction acquired from the processor 220. When the transition from the power OFF mode to the power ON mode is completed, the power supply manager 250 inputs a mode transition completion notification to the processor 220.

Although not shown, the local server 200 may include a program holder that holds a program for causing a CPU to execute processing for the local communication unit 210, the processor 220, the storage unit 230, the content list generator 240, and the power supply manager 250. As the program holder, a recording media such as a RAM, a ROM, a hard disk, a flexible disk, a compact disc, an IC chip, or a cassette tape is used, for example.

(2.2) Details of Processing by Processor

Next, details of the processing by the processor 220 according to the first embodiment of the present invention are described. In the following, it is assumed that a content list has the structure shown in FIG. 3.

First, the processor 220 receives a content list transmission request from the local reproduction device 300 via the local communication unit 210, the content list transmission request requesting transmission of a content list.

The processor 220, when receiving the content list request, transmits an item to the local reproduction device 300 regardless of the power supply mode, the item being used to request items indicating the types of content that is capable of being provided to the local reproduction device 300. Specifically, the processor 220 transmits the root directory R placed in the top layer of the content list to the local reproduction device 300.

In response to the transmission of the root directory R, the processor 220 receives selected item information from the local reproduction device 300, the selected item information indicating that the root directory R has been selected.

In response to the reception of the selected item information indicating that the root directory R has been selected, the processor 220 determines the power supply mode of the local server 200. The processor 220 executes a process corresponding to the determined power supply mode.

(a) Processing in Power ON Mode

The processor 220 transmits items as a content list to the local reproduction device 300, the items indicating the types of normal audiovisual content of the items located in the immediate lower layer of the root directory R.

The processor 220 receives selected item information from the local reproduction device 300, the selected item information indicating the item selected from the items indicating the types of normal audiovisual content.

The processor 220 transmits items as a content list to the local reproduction device 300, the items being located in the immediate lower layer of the item indicated by the received selected item information, i.e., the items representing the content names assigned to the content data corresponding to the selected type.

The processor 220 receives selected item information from the local reproduction device 300, the selected item information indicating the items selected from the items representing content names.

The processor 220 reads normal audiovisual content data from the storage 231, the normal audiovisual content data corresponding to the item indicated by the received selected item information, i.e., the normal audiovisual content data being the data to which selected content name is assigned.

The processor 220 transmits the read normal audiovisual content data to the local reproduction device 300.

In this manner, the normal audiovisual content is provided to the local reproduction device 300.

Next, a specific example of processing in the power ON mode is described with reference to FIG. 4.

First, the processor 220 transmits the menu directories A, B as a content list to the local reproduction device 300, the menu directories A, B being items from the items located in the immediate lower layer of the root directory R.

The processor 220 then receives selected item information indicating the menu directory A from the local reproduction device 300. This shows that the local reproduction device 300 is requesting the provision of audio content from the normal audiovisual content stored in the local server 200.

The processor 220 transmits the content names A1 to A3 as a content list to the local reproduction device 300, the content names A1 to A3 being the items located in the immediate lower layer of the menu directory A. The content names A1 to A3 each represent a name assigned to audio content.

The processor 220 then receives selected item information indicating the content name A1. This shows that the local reproduction device 300 is requesting provision of the audio content to which the content name A1 is assigned, from the audio content stored in the local server 200.

The processor 220 reads the normal audiovisual content data corresponding to the content name A1 from the content data storage 231. The processor 220 transmits the read normal audiovisual content data to the local reproduction device 300.

(b) Processing in Power OFF Mode

The processor 220 transmits the power supply ON information C as a content list to the local reproduction device 300, the power supply ON information C being an item from the items located in the immediate lower layer of the root directory R, and being an item used for requesting a transition from the power OFF mode to the power ON mode.

The processor 220 receives a power supply ON request from the local reproduction device 300, the power supply ON request indicating that the power supply ON information C has been selected.

The processor 220 inputs a power supply mode transition instruction to the power supply manager 250 in response to the reception of a power supply ON request, and reads mode transition content data from the content data storage 231, the power supply mode transition instruction being an instruction for causing a transition of the power supply mode of the local server 200 from the power OFF mode to the power ON mode.

The processor 220 keeps transmitting the read mode transition content data to the local reproduction device 300 until the transition from the power OFF mode to the power ON mode is completed. Specifically, when the processor 220 acquires a mode transition completion notification from the power supply manager 250, the processor 220 stops the transmission of the mode transition content data, the mode transition completion notification indicating the completion of transition from the power OFF mode to the power ON.

When the transition from the power OFF mode to the power ON mode is completed, the processor 220 transmits the items (the menu directories A, B) as a content list to the local reproduction device 300, the items indicating the types of normal audiovisual content. Specifically, the processor 220, when receiving a content list transmission request after stopping the transmission of the mode transition content data, first transmits the root directory R to the local reproduction device 300 as described above. And the processor 220, when receiving selected item information indicating that the root directory R has been selected, transmits the items (the menu directories A, B) as a content list to the local reproduction device 300, the items indicating the types of normal audiovisual content, because a transition of the power supply mode of the local server 200 to the power ON mode has been made. The processor 220, after stopping the transmission of the mode transition content data, may transmit the root directory R or the menu directories A, B as a content list to the local reproduction device 300 without receiving a content list transmission request.

(3) Configuration of Local Reproduction Device

Figure 6:
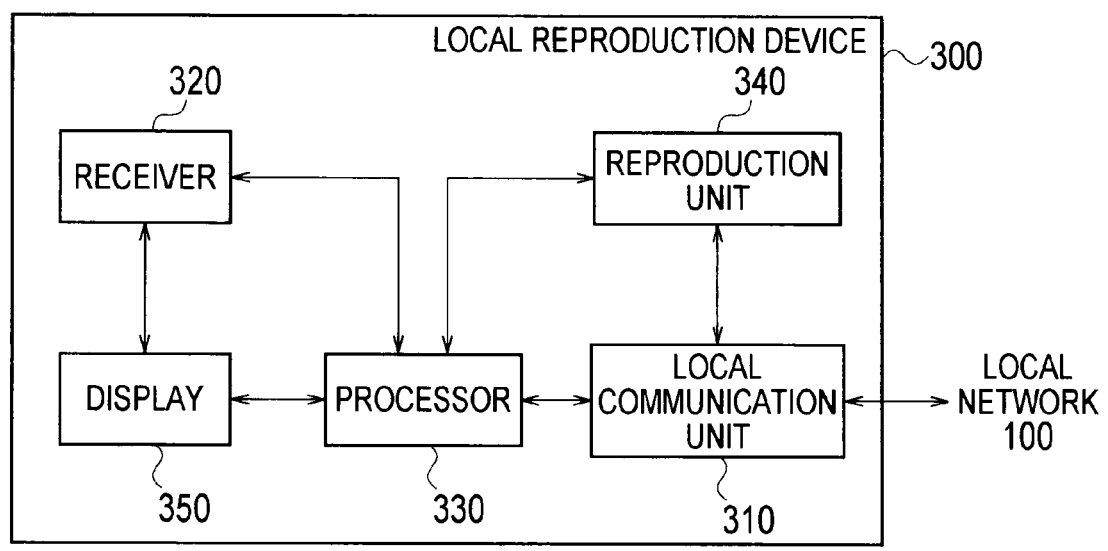
FIG. 6 is a diagram showing a local reproduction device according to the first embodiment.

Next, a configuration of a local reproduction device according to the first embodiment of the present invention is described with reference to FIG. 6. FIG. 6 is a diagram showing the local reproduction device 300 according to the first embodiment.

As shown in FIG. 6, the local reproduction device 300 includes a local communication unit 310, a receiver 320, a processor 330, a reproduction unit 340, and a display 350.

The local communication unit 310 is a hardware interface to connect the local reproduction device 300 to the local network 100. For the local communication unit 310, a LAN port or a wireless LAN port may be used.

The receiver 320 receives a request to operate the local reproduction device 300 from the outside of the local reproduction device 300. The receiver 320 receives, for example, a request for a content list. The receiver 320 inputs the received request to the processor 330. The receiver 320 receives information to select item(s) from the content list displayed on the display 350 from the outside of the local reproduction device 300.

As the receiver 320, a touch panel or a keyboard that is an operation device operable by a user of the local reproduction device 300, or a radio signal receiver from a remote controller, or a button that can be pressed by a user and arranged on the outer surface of the local reproduction device 300 may be used.

The processor 330 performs transmission processing of a request to the local server 200, and reception processing of information from the local server 200.

The processor 330, when acquiring a content list request from the receiver 320, or when the power supply of the local reproduction device 300 is turned on, transmits a content list transmission request requesting transmission of a content list to the local server 200 via the local communication unit 310.

According to the content list transmission request, the processor 330 receives the root directory R as a content list from the local server 200, the root directory R being the item used to request the items indicating the types of content that is capable of being provided to the local reproduction device 300, i.e., being the directory placed in the top layer of the content list. The processor 330 inputs the received root directory R to the display 350.

The processor 330, when acquiring information selecting the root directory R from the receiver 320, generates selected item information indicating the root directory R. The processor 330 transmits the generated selected item information to the local server 200 via the local communication unit 310.

According to the selected item information indicating the root directory R, the processor 330 receives the menu directories A, B, or the power supply ON information C as a content list from the local server 200, the menu directories A, B being the items indicating the types of normal audiovisual content, the power supply ON information C being used for requesting a transition of the power supply mode of the local server 200 from the power OFF mode to the power ON mode.

When the power supply mode of the local server 200 is in the power ON mode, the processor 330 receives the menu directories A, B that are the items indicating the types of normal audiovisual content. When the power supply mode of the local server 200 is in the power OFF mode, the processor 330 receives the power supply ON information C for requesting a transition from the power OFF mode to the power ON mode. The processor 330 inputs the received item to the display 350.

The processor 330 generates selected item information according to the information acquired from the receiver 320.

The processor 330, when acquiring information selecting the menu directory A from the receiver 320, generates selected item information indicating the menu directory A, and transmits the generated selected item information to the local server 200. The processor 330 receives the content names A1 to A3 from the local server 200 in response to the selected item information indicating the menu directory A. The processor 330 inputs the received item to the display 350.

Similarly, the processor 330, when acquiring information selecting the menu directory B from the receiver 320, generates selected item information indicating the menu directory B, and transmits the generated selected item information to the local server 200. The processor 330 receives the content names B1 to B3 from the local server 200 in response to the selected item information indicating the menu directory B. The processor 330 inputs the received item to the display 350.

The processor 330, when acquiring information selecting the content name from the receiver 320, generates selected item information indicating the content name, and transmits the generated selected item information to the local server 200. The processor 330 receives the normal audiovisual content data corresponding to the content name indicating the selected item information from the local server 200. The processor 330 inputs the received normal audiovisual content to the reproduction unit 340.

The processor 330, when acquiring information selecting power supply ON information from the receiver 320, generates a power supply ON request and transmits the generated power supply ON request to the local server 200. In response to the power supply ON request, the processor 330 receives mode transition content data from the local server 200, the mode transition content data being used for notifying that a transition from the power OFF mode to the power ON mode is in progress. The processor 330 inputs the received mode transition content to the reproduction unit 340. When the transition from the power OFF mode to the power ON mode is completed, receiving of the mode transition content data is stopped.

The reproduction unit 340 performs reproduction processing of the content data acquired from the processor 330. The reproduction unit 340 is configured with, for example, a display that displays a video, an image, or string, and/or a speaker that outputs audio.

The display 350 displays the content list acquired from the processor 330.

For example, when acquiring the root directory R, the display 350 displays a string or an image such as "Menu." Also, for example, when the display 350 acquires the menu directories A, B, the display 350 displays a string or an image such as "Menu A: audio", "Menu B: video." Also, for example, when the display 350 acquires the power supply ON information, the display 350 displays a string or an image such as "Power supply of the local server is turned ON."

Although not shown, the local reproduction device 300 may include a program holder that holds a program for causing a CPU to execute processing of the local communication unit 310, the receiver 320, the processor 330, the reproduction unit 340, and the display 350. As a program holder, a recording media such as a RAM, a ROM, a hard disk, a flexible disk, a compact disc, an IC chip, or a cassette tape may be used, for example.

(4) Operations of Content Transmission System

In the following, operations of the content transmission system according to the first embodiment of the present invention are described with reference to FIGS. 7 and 8.

(4.1) In the Case of Power ON Mode

Figure 7:
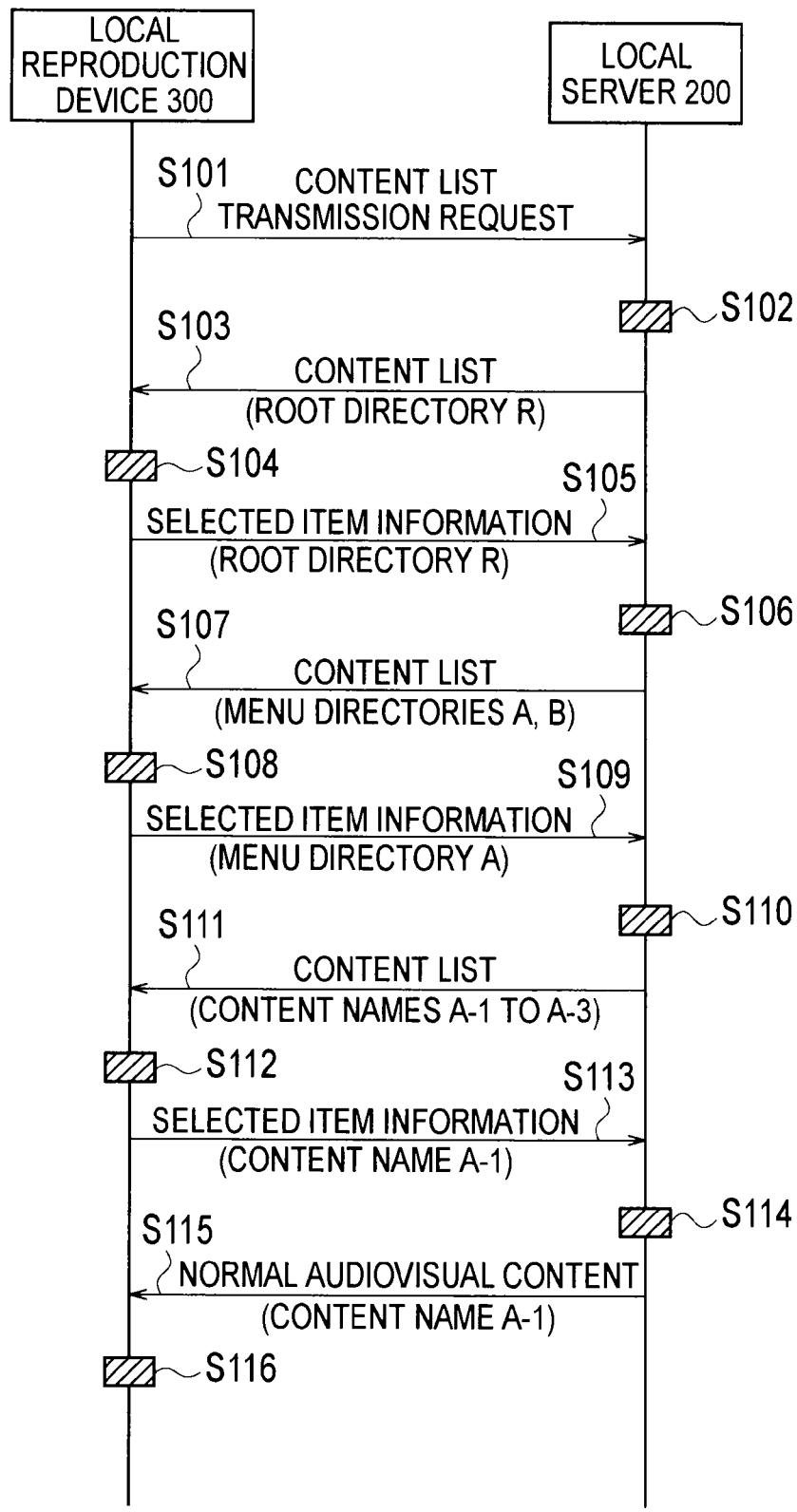
FIG. 7 is a sequence diagram showing operations of the content transmission system according to the first embodiment (in the case of power ON mode).

FIG. 7 is a sequence diagram showing operations of the content transmission system when the power supply mode of the local server 200 is in the power ON mode.

As shown in FIG. 7, in step S101, the local reproduction device 300 transmits a content list transmission request to the local server 200.

In step S102, the local server 200 reads the root directory R which is the item used to request the items indicating the types of content that is capable of being provided to the local reproduction device 300.

In step S103, the local server 200 transmits the read root directory R as a content list to the local reproduction device 300.

In step S104, the local reproduction device 300 displays the received root directory R. For example, the local reproduction device 300 displays a string or an image such as "Menu" on the display 350. The local reproduction device 300, after displaying the root directory R, receives information selecting the root directory R from the outside of the local reproduction device 300.

In step S105, the local reproduction device 300 transmits selected item information indicating that the root directory R has been selected to the local server 200.

In step S106, the local server 200 determines the power supply mode. The local server 200, when determining that the power supply mode is in the power ON mode, reads the menu directories A, B from the items indicating the content which is capable of being provided to the local reproduction device 300, the menu directories A, B being the items indicating the types of normal audiovisual content.

In step S107, the local server 200 transmits the read menu directories A, B as a content list to the local reproduction device 300.

In step S108, the local reproduction device 300 displays the received menu directories A, B. For example, the local reproduction device 300 displays a string or an image such as "Menu A: audio", "Menu B: video" on the display 350. The local reproduction device 300, after displaying the menu directories A, B, receives information selecting the menu directory A from the outside of the local reproduction device 300.

In step S109, the local reproduction device 300 transmits the selected item information indicating that the menu directory A has been selected to the local server 200.

In step S110, the local server 200 reads the content names A1 to A3 which are the items placed in the immediate lower layer of the selected menu directory A.

In step S111, the local server 200 transmits the read content names A1 to A3 as a content list to the local reproduction device 300.

In step S112, the local reproduction device 300 displays the received content names A1 to A3. For example, the local reproduction device 300 displays a string or an image such as "music title A1", "music title A2", and "music title A3" on the display 350. The local reproduction device 300, after displaying the content names A1 to A3, receives information selecting the content name A1 from the outside of the local reproduction device 300.

In step S113, the local reproduction device 300 transmits the selected item information indicating that content name A1 has been selected to the local server 200.

In step S114, the local server 200 reads the normal audiovisual content data corresponding to the content name A1.

In step S115, the local server 200 transmits the read normal audiovisual content data to the local reproduction device 300.

Instep S116, the local reproduction device 300 reproduces the received normal audiovisual content data.

(4.2) In the Case of Power OFF Mode

Figure 8:
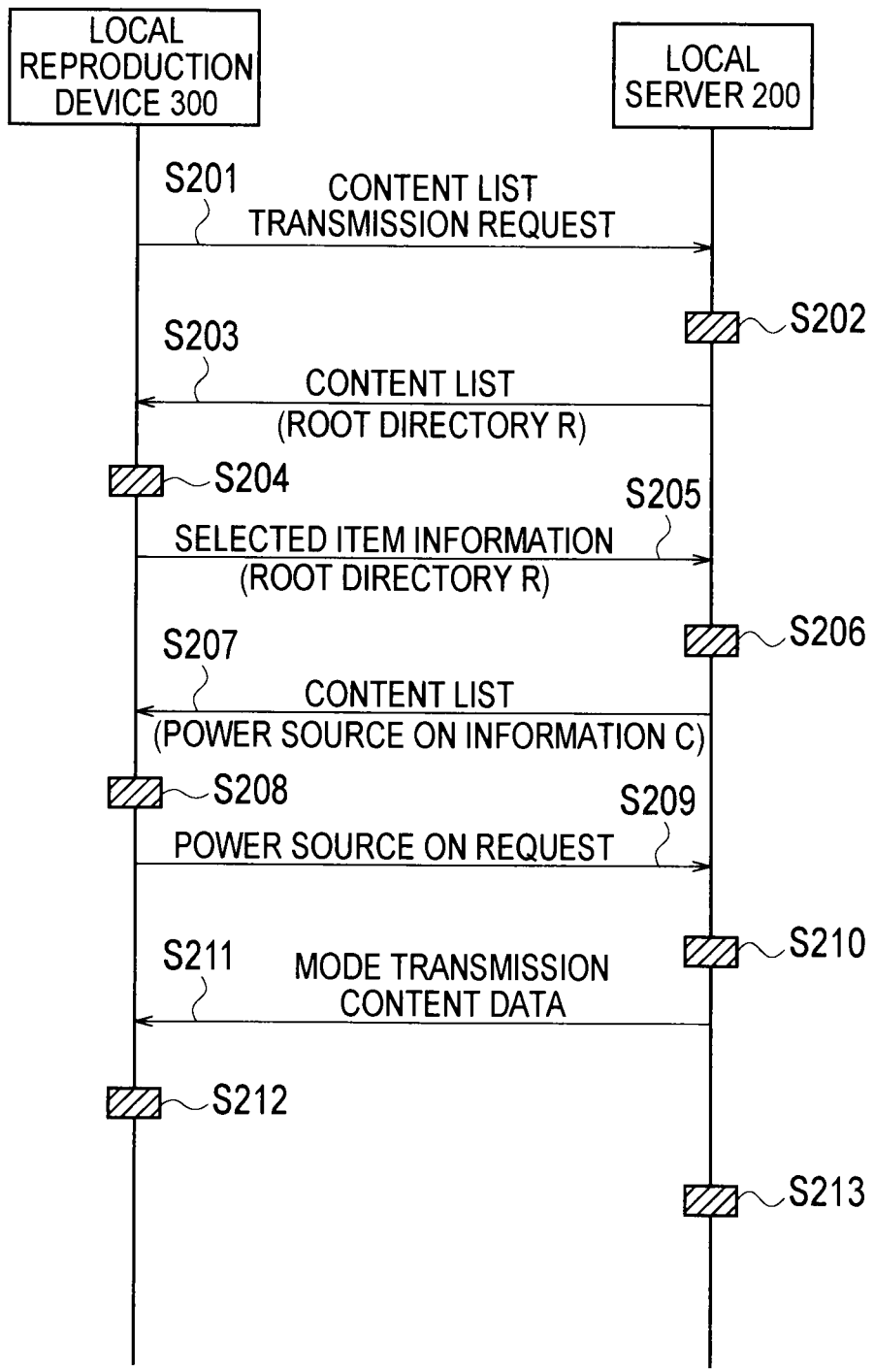
FIG. 8 is a sequence diagram showing operations of the content transmission system according to the first embodiment w (in the case of power OFF mode).

FIG. 8 is a sequence diagram showing operations of the content transmission system when the power supply mode of the local server 200 is in the power OFF mode. Since the steps S201 to S205 in FIG. 8 are similar to the steps S101 to S105 in FIG. 7, descriptions thereof are omitted.

As shown in FIG. 8, in step S206, the local server 200 determines the power supply mode. The local server 200, when determining that the power supply mode is in the power OFF mode, reads the power supply ON information C from the items indicating the content which is capable of being provided to the local reproduction device 300, the power supply ON information C being used for requesting a transition from the power OFF mode to the power ON mode.

In step S207, the local server 200 transmits the read power supply ON information C as a content list to the local reproduction device 300.

In step S208, the local reproduction device 300 displays the received power supply ON information C. For example, the local reproduction device 300 displays a string or an image such as "Power supply of the local server is turned ON" on the display 350. The local reproduction device 300, after displaying the power supply ON information C, receives information selecting the power supply ON information C from the outside of the local reproduction device 300.

In step S209, the local reproduction device 300 transmits a power supply ON request to the local server 200.

In step S210, the local server 200 starts a transition from the power OFF mode to the power ON mode and reads mode transition content data.

In Step S211, the local server 200 transmits the read mode transition content data to the local reproduction device 300.

In step S212, the local reproduction device 300 reproduces the received mode transition content data.

In step S213, the local server 200 detects that a transition from the power OFF mode to the power ON mode has been completed. Then, the local server 200 stops the transmission of the mode transition content data.

(5) Operations and Effects

According to the content transmission system 1 of the first embodiment of the present invention, the local reproduction device 300, when receiving a content list request from the outside of the local reproduction device 300, or when the power supply of the local reproduction device 300 is turned on, transmits a content list transmission request to the local server 200, the content list transmission request requesting transmission of the content list. In the case of the power ON mode, in response to the reception of the content list transmission request, the local server 200 transmits items as a content list to the local reproduction device 300, the items indicating the types of normal audiovisual content. On the other hand, in the case of the power OFF mode, in response to reception of the content list transmission request, the local server 200 transmits an item as a content list to the local reproduction device 300, the item indicating power supply ON information for requesting a transition from the power OFF mode to the power ON mode.

The local server 200, when receiving a power supply ON request from the local reproduction device 300, the power supply ON request indicating that the power supply ON information has been selected in the local reproduction device 300, causes a transition of the power supply mode of the local server 200 from the power OFF mode to the power ON mode.

According to such configuration, information to cause a transition of the power supply mode of the local server 200 is transmitted to the local reproduction device 300 in a format that may be used by the local reproduction device 300, i. e., the content list format. Accordingly, the power supply mode of the local server 200 may be controlled even with the local reproduction device 300 in which dedicated software for controlling the power supply mode of the local server 200 is not installed. Especially, in the case where power supply ON information is transmitted to the local reproduction device 300 in response to a content list transmission request transmitted at the time of turn-on of the local reproduction device 300, a transition of the power supply mode of the local server 200 to the power ON mode is made in response to the turn-on of the local reproduction device 300. Thus, the power supply of the local server 200 may be controlled in conjunction with the power supply of the local reproduction to device 300.

Thus, the power supply of the local server 200 may be controlled in conjunction with the power supply of the local reproduction device 300 without installing dedicated software to the local reproduction device 300.

[Other Embodiments]

Although the invention has been disclosed through the embodiment according to the present invention as described above, it should be understood that the discussion and drawings which form a part of the disclosure are not intended to limit the invention. Various alternative embodiments, implementation examples, and application techniques will be apparent to those skilled in the art.

For example, although the first embodiment mentioned above is described for the case where one local reproduction device 300 is connected to the local network 100; however, the present invention is not limited to this case. For example, multiple local reproduction devices 300 may be connected to the local network 100. In this case, the local server 200 may transmit the power supply ON information to all of the local reproduction devices 300 connected to the local network 100, or only to a specific local reproduction device 300.

The above-mentioned first embodiment has been described in the case where when a transition from the power OFF mode to the power ON mode is completed, transmission of the mode transition content data for notifying that a transition from the power OFF mode to the power ON mode is in progress is stopped. The local server 200, after stopping the transmission of the mode transition content data, may further transmit mode transition completion content data for notifying the completion of the transition from the power OFF mode to the power ON mode.

Further, the above-mentioned first embodiment has been described in the case where the mode transition content is transmitted to the local reproduction device 300 during a transition from the power OFF mode to the power ON mode; however the present invention is not limited to this case. The mode transition content may not be transmitted to the local reproduction device 300 during a transition from the power OFF mode to the power ON mode.

Furthermore, a program that causes a computer to execute the operations (i.e., the sequences shown in FIGS. 7 and 8) of the content transmission system 1 may be provided, for example. A storage in which such program is stored may also be provided. A storage in which the program is stored is, for example, a CD-ROM attached to each of the local reproduction device, the local server, and the public server.

In this manner, the present invention naturally includes various embodiments not specifically described herein. Accordingly, the technical scope of the present invention should be defined only by the specifications of the invention according to the claims based on the above description.

What is claimed is:

1. A local server configured to transmit a content list to a local reproduction device connected to the local server via a local network, the content list being a list of content that is capable of being provided to the local reproduction device, the local server having a power OFF mode and a power ON mode, the local server comprising:
   a transmitter configured to transmit power supply ON information as the content list to the local reproduction device when the local server is in the power OFF mode, the power supply ON information allowing the local reproduction device to request a transition of the local server to the power ON mode;
   a receiver configured to receive a power supply ON request from the local reproduction device, the power supply ON request indicating that the power supply ON information has been selected; and
   a power supply manager configured to cause a transition from the power OFF mode to the power ON mode in response to the power supply ON request, wherein
   the power supply ON information is only used by the local reproduction device to send the power supply ON request from the local reproduction device to the receiver of the local server.

2. The local server according to claim 1, wherein
the transmitter continues transmitting mode transition content to the local reproduction device in response to the power supply ON request until the transition from the power OFF mode to the power ON mode is completed, and
the mode transition content is content for notifying that the transition from the power OFF mode to the power ON mode is in progress.

3. The local server according to claim 1, wherein
when the transition from the power OFF mode to the power ON mode is completed, the transmitter transmits a list of normal audiovisual content as the content list to the local reproduction device, and
the normal audiovisual content is content that is capable of being provided to the local reproduction device in the power ON mode.

4. The local server according to claim 1, wherein
the receiver receives a content list transmission request transmitted by the local reproduction device when the power supply of the local reproduction device is turned on in the power OFF mode, and
the transmitter transmits the power supply ON information as the content list to the local reproduction device in response to the reception of the content list transmission request by the receiver in the power OFF mode.

5. A control method of a local server that transmits a content list to a local reproduction device connected to the local server via a local network, the content list being a list of content that is capable of being provided to the local reproduction device, the local server having a power OFF mode and a power ON mode, the method comprising the steps of:
   transmitting power supply ON information as the content list to the local reproduction device when the local server is in the power OFF mode, the power supply ON information allowing the local reproduction device to request a transition of the local server to the power ON mode;
   receiving a power supply ON request from the local reproduction device, the power supply ON request indicating that the power supply ON information has been selected; and
   causing a transition from the power OFF mode to the power ON mode in response to the power supply ON request, wherein
   the power supply ON information is only used by the local reproduction device to send the power supply ON request from the local reproduction device to the receiver of the local server.

6. The control method according to claim 5, further comprising the step of transmitting mode transition content to the local reproduction device in response to the power ON request until the transition from the power OFF mode to the power ON mode is completed, the mode transition content being content for notifying that the transition from the power OFF mode to the power ON mode is in progress.

7. The control method according to claim 5, further comprising the step of transmitting a list of normal audiovisual content as the content list to the local reproduction device when the transition from the power OFF mode to the power ON mode is completed, the normal audiovisual content being content that is capable of being provided to the local reproduction device in the power ON mode.

8. The control method according to claim 5, further comprising the step of receiving a content list transmission request transmitted by the local reproduction device when the power supply of the local reproduction device is turned on in the power OFF mode, wherein
   in the step of transmitting the power supply ON information, the power supply ON information is transmitted as the content list to the local reproduction device in response to the reception of the content list transmission request in the power OFF mode.

* * * * *